A. E. BROWN.
THILL COUPLING AND SUPPORT.
APPLICATION FILED DEC. 22, 1906.
913,806.
Patented Mar. 2, 1909.
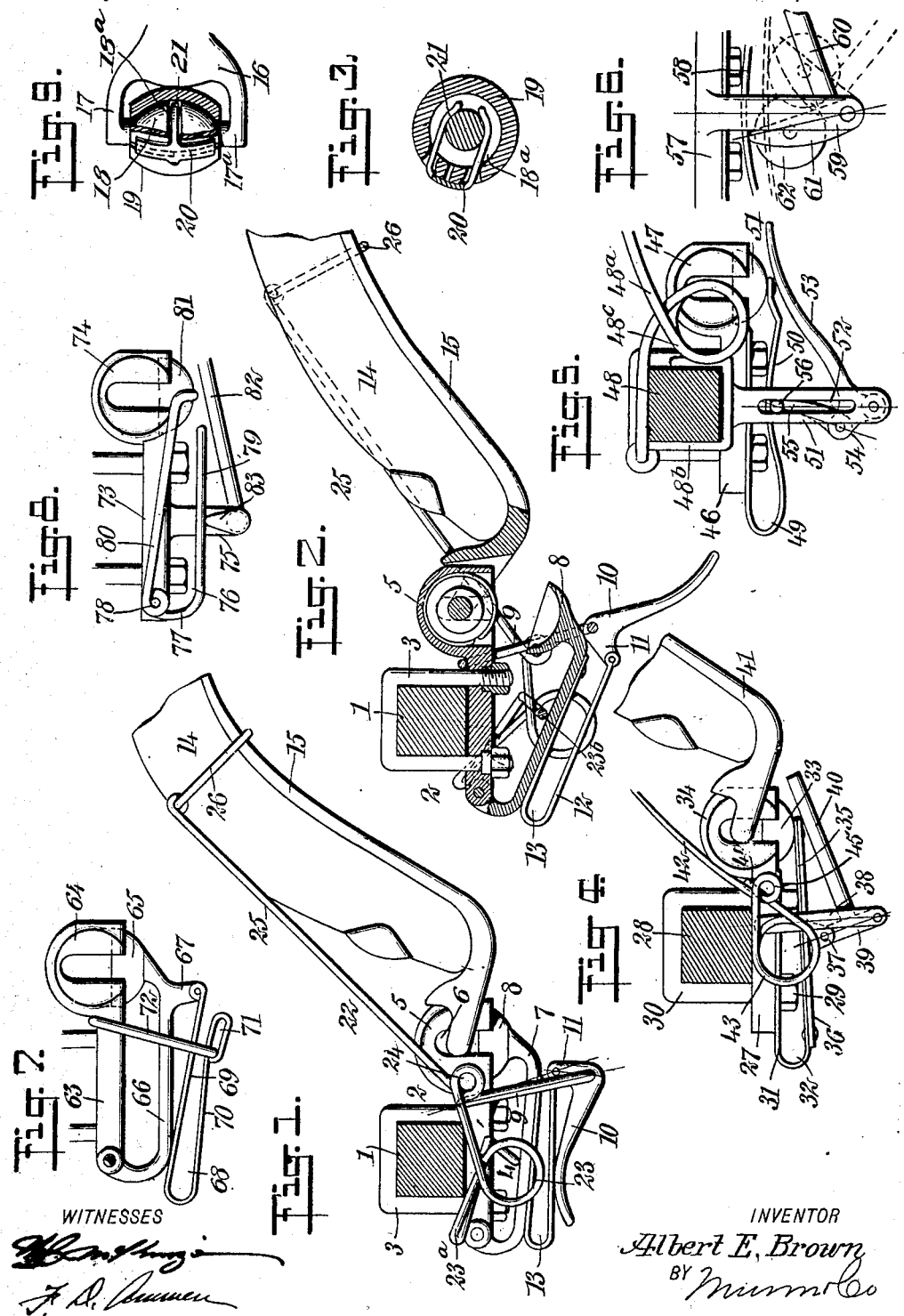
WITNESSES
INVENTOR
Albert E. Brown
BY
ATTORNEYS

UNITED STATES PATENT OFFICE.

ALBERT E. BROWN, OF BROOKFIELD, NEW YORK.

THILL COUPLING AND SUPPORT.

No. 913,806.  Specification of Letters Patent.  Patented March 2, 1909.

Application filed December 22, 1906. Serial No. 349,047.

*To all whom it may concern:*

Be it known that I, ALBERT E. BROWN, a citizen of the United States, and a resident of Brookfield, in the county of Madison and State of New York, have invented a new and Improved Thill Coupling and Support, of which the following is a full, clear, and exact description.

This invention relates to vehicles, and the object of the invention is to produce a thill coupling and support for attaching the shafts of vehicles, which will be simple in construction and operate efficiently to hold and support the thills without rattling, and in such a way that the wear of the parts may be taken up.

A further object of the invention is to so construct the parts that the shafts may be readily attached and in such a way that the joint will be protected as far as possible from dust and dirt.

A further object of the invention is to so construct the parts that thills may be readily interchanged for a pole and vice-versa, and so construct the device that it will be an impossibility to uncouple the thills or pole accidentally or otherwise when they are raised in the normal position of driving.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of the thill coupling showing a portion of the thill, together with the thill support, the axle of the vehicle being represented in cross section; Fig. 2 represents the coupling shown in Fig. 1 but represents the parts in an open position so as to illustrate the manner in which the thill is attached; Fig. 3 is a cross section through the joint of the thill and illustrating the manner of attaching the packing; Fig. 4 is a view similar to Fig. 1 but representing a modified construction of the device; Fig. 5 is a view similar to Fig. 4 but showing another form the device may take; in this view the thill is not illustrated; Fig. 6 is a fragmentary view illustrating another modified form the invention may take, and involving the use of an anti-friction roller; Fig. 7 is a side elevation showing another modified form; Fig. 8 is also a side elevation and showing another modified form, in which the operating lever controls the device through the medium of a cam; and Fig. 9 is a plan view showing the rear end of the thill iron showing the packing or bushing partly in section and also showing the keeper for the bushing.

Referring more particularly to the parts, and especially to Figs. 1 and 2, 1 represents the front axle of the vehicle. To this axle, at each side at the usual point, I attach clips 2. Each of these clips comprises a U-bolt 3, the arms of which project downwardly below the axle, and to these arms a cap plate or socket plate 4 is rigidly attached. This socket plate projects forwardly from the axle and is formed with an enlargement or head having a socket 5 which opens downwardly as shown. This socket is preferably of elongated spherical form, with substantially flat end walls which are formed with vertical slots 6 which extend downwardly to the lower edge of the socket as shown. To the rear extremity of the socket plate 4 a keeper 7 is pivotally attached, and this keeper projects forwardly and is formed at its lower extremity with a follower or cup 8 which is adapted to be forced into the lower portion of the socket 5. Around the forward portion of the socket plate 4 and between the axle and the socket 5, a link 9 is hung, and the lower extremity of this link carries pivotally a lever 10. The said lever is provided with a rearwardly projecting toe 11 which is pivotally attached to a leaf spring 12, having the form of a "U", the upper leg of the "U" being attached to the under side of the keeper 7 as shown, so that the bow or bight 13 of the spring is disposed rearwardly. The thill 14 is provided on its under side with a thill iron 1 which is rigidly attached to the thill in any suitable manner. This thill iron is formed at its rear extremity with a fork 16 which projects rearwardly beyond the thill as shown. On the said thill between the arms 17 of the fork, an oval enlargement or ball 18 is formed, the said ball preferably being of elongated spherical form so as to conform to the shape of the interior of the socket 5.

The ball is covered by a packing or bushing 19 which consists of a split, substantially spherical shell adapted to be opened out and applied to the ball so as to envelop the same. In order to secure the bushing in position, I provide a keeper 20, which consists of a light, curved plate of elongated form which lies over the meeting edges of the bushing. The ball 18 as shown in Fig. 3, is preferably formed with a circumferential groove $18^a$ near its middle plane. The keeper 20 is preferably provided with resilient fingers 21 adapted to lie in the groove $18^a$, the fingers 21 preferably being curved at their inner extremities to extend partly around the pin $17^a$ which connects the forks 17 and on which the ball is supported. When the keeper is applied as indicated, it will evidently hold the bushing in position, but it can be readily removed by pulling the plate outward, as will be readily understood.

When the thill is to be attached to the axle, the balls 18 are inserted respectively in the sockets 5, the device being first opened into the position shown in Fig. 2. In this connection it should be understood that the device is opened simply by moving the lever 10 forwardly into substantially the position shown in this figure. It will be understood that in giving the lever this movement the toe 11 is pulled downwardly, so that the keeper springs downwardly in such a way that the cup 8 becomes withdrawn from the socket. When the ball has been received in the socket, the lever 10 is rotated rearwardly into the position in which it is represented in Fig. 1, and this movement operates to force the keeper 7 upwardly so as to clamp the cup 8 against the under side of the ball, at the same time carrying the lower transverse extremity of the thill support 22 in an upward direction and thereby producing a tension adapted to substantially support the thills. In this form of the thill support the spring 12 would need to be considerably heavier than that in the form shown in Figs. 4 and 5. Attention is called especially to the form shown in Fig. 5, as it effectively places all the torsional strain directly upon the axles thereby materially relieving the socket plate fastenings. From an inspection of Fig. 1, it will be observed that the pivot connection between the spring 12 and the lever 10 is disposed to the right of the axis of the link; in other words, beyond the line in which the tension of the link is applied to the lever, and hence this position is the position of equilibrium. The resiliency of the spring 12, of course, operates to maintain the keeper constantly in contact with the ball. In this way the thill is very securely held at the socket. The packing 19 is of such a material as to operate as a lubricant and effectually prevents squeaking when the shaft moves up or down with the motion of the parts.

In connection with the construction of the fork 16, it should be observed that the extremities of the pin $17^a$ project at the ends of the ball and pass through the slots 6 in the end walls of the socket. And it should also be especially noted that in this construction of the fork 16, the main body thereof is adapted to nearly abut the outer circumferential surface of the socket 5, and is preferably so formed as to absolutely prevent a possible detachment of the two members when the device is in a normal position; the front face of said socket preferably being cut away to allow a ready reception of the fork 16 when the thills are lowered. This thill coupling is intended to be interchangeable for both thills and a pole, by using forks suitably relative thereto, as will be readily understood.

In order to assist in supporting the thill in the socket 5, I provide a thill support 22. This thill support is formed of resilient wire which is bent into coils 23 adapted to seat under the axle as shown. The material is bent upon itself to form rearwardly and upwardly projecting spurs $23^a$, disposed at each side of the socket plate, and these spurs are connected near the coils 23 by a transverse bar $23^b$, which bends downwardly and rests against the upper side of the socket plate. Near the forward portion of the axle, the material is bent around to form loops 24, and beyond these loops the device is formed with upwardly extending arms 25, which lie on each side of the thill. The upper extremities of these arms are attached to a stirrup 26, preferably formed of wire like the body of the device, and this stirrup passes under the thill in the manner shown. The resiliency of the loops 23 and 24 tends to force the upper extremities of the arms 25 upwardly and rearwardly, so that a force is constantly exerted which tends to hold the ball of the thill in its socket, and act substantially as a support for the thills.

In Fig. 4, I illustrate a modified form of the invention. In this case, the socket plate 27 has substantially the same form as the socket plate 4, and is attached in the same manner to the axle 28. The nuts 29, which are attached upon the ends of the U-bolt 30 of the clip, afford means for attaching a leaf spring 31 which is formed at its rear side with a bow 32. The lower leg 35 of the spring projects forwardly and carries a cup 33 which is adapted to be received in the socket 34, as shown. On the under side of the leg 35 of the spring, a reinforcing plate 36 is preferably attached, and this plate is provided on its under side with a downwardly projecting ear 37. At a suitable point on the side of the socket plate 27, a link 38 is pivoted, and this link hangs downwardly as shown, and its lower extremity is attached to the lower extremity of a cross head 39 which is formed upon a lever 40; the opposite end of the cross head being pivotally attached to the ear 37 as shown. The lever 40 normally occupies the position shown in the figure, so that the point of connection between the ear 37 and the head 39 is disposed to the left of the axis of the link 38. When it is desired to open the socket to place the thill 41 in position, the lever 40 is forced downwardly and toward the left. The lower end of the link 38 then rotates rearwardly and the upper end of the cross head 39 moves downwardly, carrying with it the lower leg 35 of the spring. In this way the cup 33 is withdrawn from the socket so as to release the thill. With this form of the device I prefer to use a thill support 42, the arm of which is constructed like the arm 25 of the thill support shown in Fig. 1, and the upper end of this arm is attached to the thill in the same manner as illustrated in Fig. 1. The lower portion of the thill support is formed with a pair of oppositely disposed coils or springs 43 which preferably lie on the opposite sides of the socket plate under the axle, and the wire out of which the thill support is made is formed with a loop 44 which preferably hangs over the upper side of the socket plate between the socket and the axle. In the lower portion of the arm of the device, auxiliary coils or springs 45 are formed, as shown, the same being similar to the coils 24 referred to above.

In the form shown in Fig. 5, the socket plate 46 has substantially the same form as in the preceding form of the device, presenting a socket 47 disposed forward of the axle 48. On the under side of the socket plate 46 a spring 49 is attached, having an upwardly bowed lower leg 50, the extremity of which carries a cup 51 which normally is disposed within the socket 47 as shown. At each side of the socket plate guide posts 51$^a$ project downwardly, and these are provided with longitudinal slots 52 respectively. At the lower extremity of each of these guide posts, a lever 53 is pivotally attached, the said lever having a toe 54 to which there is attached pivotally a finger 55, the said finger having laterally projecting pins 56 which run in the slots, as will be readily understood. The upper end of this finger rests against the under side of the leg 50, so that when the lever 53 is held in the position shown, the cup 51 is forced into the socket. The point of connection between the finger 55 and the toe 54, is disposed toward the left of the line joining the upper end of the finger with the pivot point of the lever, so that the device locks itself in position. When it is desired to open the socket, the lever 53 is pulled downwardly, which draws down the finger 55. The resiliency of the spring 49 tends to hold the lower leg 50 thereof in a depressed position, so that when the finger 55 moves downwardly, so does the cup 51.

With this form of the device I prefer to use a thill support comprising an anchor or anchor-clamp 48$^b$, which consists of a wire bent as shown, so as to engage the under side of the axle. At the rear and upper side of the axle this clamp is attached to an arm 48$^a$, the rear portion of which is formed with a shank resting on the upper side of the axle, and forward of the axle this arm is bent to form resilient coils 48$^c$. The forward end of the arm is attached to the thill in any suitable manner.

In the form shown in Fig. 6, the socket plate 57 is similar to the socket plate 46, and the cup is attached to a spring 58 mounted in the same way as the spring 49, and tending to withdraw the cup from the socket. On each side of the socket plate, posts 59 extend downwardly, and to the lower extremity of these posts a lever 60 is pivotally attached, the said lever being provided with a head 61 which carries a roller 62. When the lever is in the position in which it is shown in full lines, the end of the head 61 rests against the under side of the spring, as shown, it being observed that this head projects beyond the periphery of the roller. It should be understood that the lever 60 is swung downwardly to open the socket, in the position in which it is shown in dotted lines, and during this operation the face of the roller engages with the spring 58.

With the form of the device shown in Fig. 7, the socket plate 63 has substantially the form of the socket plates already described, being provided with a forwardly disposed socket 64, which may be closed by a cup 65 carried upon the forward extremity of a keeper 66, which keeper is pivoted at the rear extremity of the socket plate, similarly to the keeper 7 as described in connection with Fig. 1. Near its forward end, the keeper 66 is provided with a laterally projecting lug 67, to which a leaf spring 68 is attached. This spring presents two legs 69 and 70, the former of which is disposed upwardly, and is attached pivotally at its extremity to the lug 67 as shown. The lower leg 70 is preferably formed at its extremity with an elongated eye 71, and through this eye passes a link 72, the upper extremity of which is preferably hung across the socket plate 63 at a point between the socket 64 and the axle. In this form of the device, when the socket is closed, the upper leg 69 of the spring 68 rests against the rear portion of the keeper 66, as shown. The spring 68 constitutes a lever for opening the socket, and, in order to accomplish this, the lever is rotated downwardly. As this movement takes place, the lower end of the link slides toward the extremity of the eye 71, and the resiliency of the spring 68, which tends to separate the legs 69 and 70, pulls the keeper 66 downwardly in such a way as to withdraw the cup 65 from the socket.

In the form of the device shown in Fig. 8, the socket plate 73 is formed at the forward end with a socket 74, and is provided on its lower side with a downwardly projecting post 75. The keeper 76 is in the form of a spring 77, the material of which is twisted to form an eye 78 which is pivotally attached on the side of the socket plate, near the rear thereof. The keeper or spring is provided with a substantially horizontal lower leg 79 and an upper leg 80, the extremity of which carries a cup 81, normally held in the socket. At the lower extremity of the post 75, a lever 82 is pivotally attached, which lever is formed with a cam or toe 83 adapted to engage the lower side of the leg 79. When the lever 82 is in substantially the position shown, the cup 81 is held within the socket, but if the lever is rotated downwardly so that the cam 83 passes toward the right, the keeper 76 will allow the cup 81 to descend to open the socket, the cam preferably lying normally to the left of the axis of the post 75.

It will be observed that in all the forms of the device the socket opens downwardly, and when the cup of the keeper is in position, it will be resiliently constrained against the lower side of the ball within the socket. On account of this arrangement, the ball is securely held and rattling is prevented.

Having thus described my invention, I claim as new and desire to secure by Letters Patent,—

1. In a thill coupling, a clip plate having a substantially spherical socket and vertical slots in the end walls of the socket, said socket and slots opening from the under side of the plate and closed at the top, a thill iron having a substantially spherical enlargement arranged in said socket, said thill iron having journal bearings at opposite sides of said enlargement arranged in the vertical slots, a keeper movable in the open under side of the socket into and out of engagement with the under side of said enlargement, and means including a spring permanently connected to the keeper for forcing the keeper to its operative position.

2. In a thill coupling, a circular socket and vertical slots in the end walls, the socket and slots opening from the under side of the head and the top of the head being concentric with the circular socket, a thill iron having a coupling pin arranged in said socket and slots, said thill iron having a portion thereof overhanging and in close proximity to the concentric upper face of the head to retain the coupling pin in the socket and slots when adjusted for use, and a keeper movable in the lower open end of the socket for further retaining the coupling pin in its operative position.

3. In a thill coupling, a fixed head having a circular bearing and vertical slots at the end of the circular bearing, said circular bearing and slots opening from the under side of the head, the top face of the head being concentric with the circular bearing, a thill iron having a coupling pin inserted from the under side of the head into said bearing and slots, a follower movable in the open under side of the head for retaining the coupling pin in operative position, said thill iron having a portion thereof overhanging and in close proximity to the concentric upper face of the head to prevent downward displacement of the coupling pin when adjusted for use, the front face of the head being spaced apart from the axis of the coupling pin a less distance than the distance between said axis and concentric upper face of the head to permit said thill iron to be detached from the head by a downward movement when said overhanging part of the thill iron is brought into registration with said front face of the head.

4. In a thill coupling, in combination, a socket plate adapted to be attached to the axle and having formed thereon a socket adapted to receive a thill iron, a thill iron substantially forming at one extremity a circular body adapted to be received in said socket, a split bushing adapted to be received around the periphery of said circular body, a spring clip adapted to retain said bushing in position and having transverse fins adapted to substantially cover the split in said bushing, said thill iron being suitably adapted for attachment to both the thills and pole of a vehicle.

5. In a thill coupling, a clip plate having an enlarged head provided with a socket and end slots opening from the under side of the head, a thill iron having a coupling pin inserted from the under side into said socket and slots, a follower movable into and out of the open under side of the socket, and means including a spring permanently connected to and movable with the follower for retaining the follower in operative position.

6. In a thill coupling, a coupling pin having an annular groove substantially midway between its ends, a circular packing surrounding the coupling pin and groove and split through one side to permit it to be placed over and upon the coupling pin and removed therefrom, and a clasp covering the greater portion of the split side of the packing and provided with spring arms riding in said groove and embracing the adjacent portion of the coupling pin.

7. In a thill coupling, a coupling pin and packing surrounding the coupling pin and split longitudinally through one side to permit said packing to be placed upon and removed from said coupling pin, a thin metal plate covering the greater portion of the meeting edges of the packing and provided with spring arms passed through the packing at opposite sides of the split and grasping the coupling pin.

In testimony whereof I have signed my name to this specification in the presence of two subscribing witnesses.

ALBERT E. BROWN.

Witnesses:
H. M. CROWLEY,
MARTIN DAUER.